United States Patent [19]
Trimmer et al.

[11] Patent Number: 5,251,868
[45] Date of Patent: Oct. 12, 1993

[54] CONNECTOR PIN ASSEMBLY FOR CONCRETE FORM PANEL UNITS

[75] Inventors: James E. Trimmer; Dwight E. Hibbs, both of Kansas City, Mo.

[73] Assignee: Precise Forms, Inc., Kansas City, Mo.

[21] Appl. No.: 871,198

[22] Filed: Apr. 20, 1992

[51] Int. Cl.$^5$ .................... E04G 17/04; F16B 41/00
[52] U.S. Cl. .................... 249/196; 249/219.1; 411/353
[58] Field of Search .............. 249/6, 47, 192, 196, 249/219.1; 411/352, 353, 354

[56] References Cited

U.S. PATENT DOCUMENTS

| | | | |
|---|---|---|---|
| 3,204,918 | 9/1965 | Bonin et al. | 249/196 |
| 3,765,465 | 10/1973 | Gulistan | 411/353 |
| 3,877,674 | 4/1975 | Cerutti | 249/196 |
| 4,194,717 | 3/1980 | Easton et al. | 249/196 |
| 4,285,380 | 8/1981 | Gulistan | 411/353 |
| 4,963,063 | 10/1990 | Gulistan | 411/353 |
| 4,975,009 | 12/1990 | Easton et al. | 249/192 |
| 5,082,406 | 1/1992 | Cosenza | 411/353 |
| 5,083,740 | 1/1992 | Sawyer et al. | 249/196 |

FOREIGN PATENT DOCUMENTS

| | | | |
|---|---|---|---|
| 2531463 | 2/1977 | Fed. Rep. of Germany | 249/196 |
| 2747064 | 5/1979 | Fed. Rep. of Germany | 249/196 |
| 2515716 | 5/1983 | France | 249/196 |

Primary Examiner—Jay H. Woo
Assistant Examiner—James P. Mackey
Attorney, Agent, or Firm—Hovey, Williams, Timmons & Collins

[57] ABSTRACT

An improved, lightweight, retrofittable pin assembly (10) for the releasable interconnection of end-to-end abutting concrete form panels (12, 14) is provided which includes an elongated, tapered, axially shiftable pin (16) as well as coupler (18) for coupling the pin to an end wall (24) of a panel (12). The coupler (18) includes a resilient metallic retaining ring (58) which frictionally and compressively engages the pin in substantial alignment with an associated aperture (27) in end wall (24). The pin (16) preferably includes a pair of elongated, opposed sots (34, 36), and a two-piece, split tab washer (60) is employed for preventing complete detachment of the pin (16) from assembly (10) during use thereof.

9 Claims, 2 Drawing Sheets

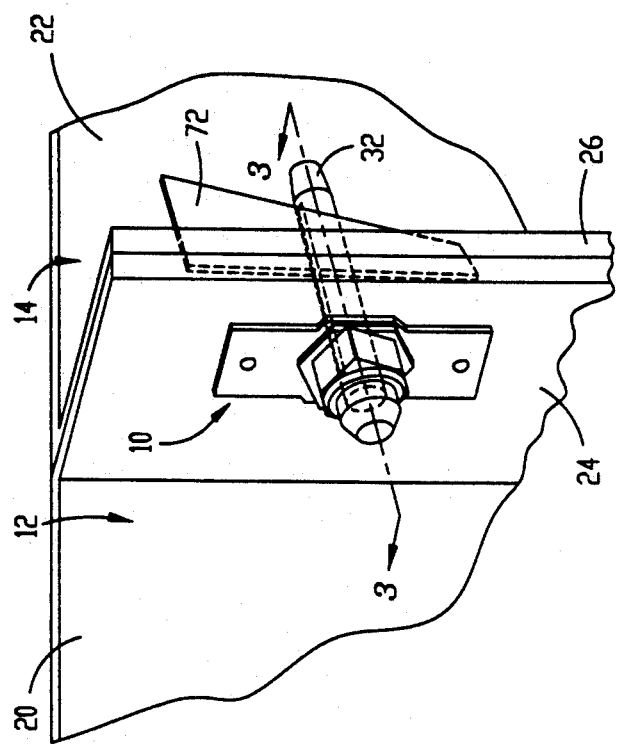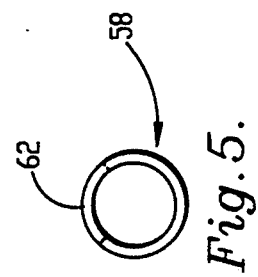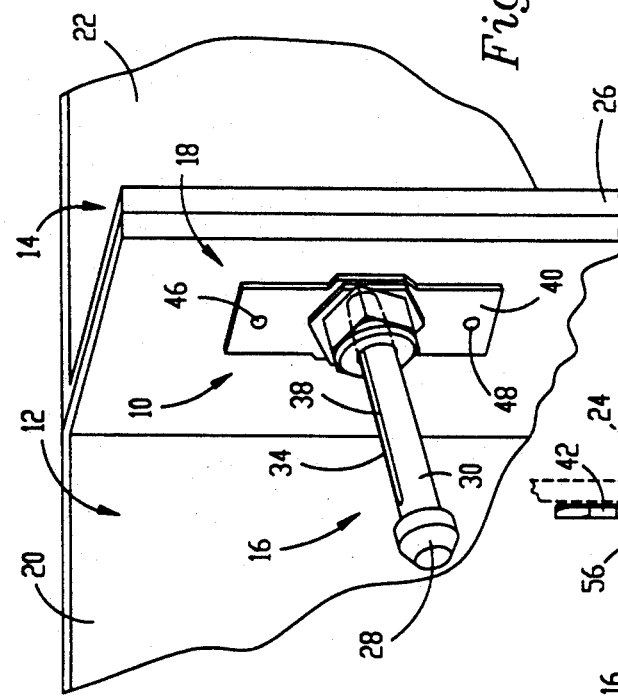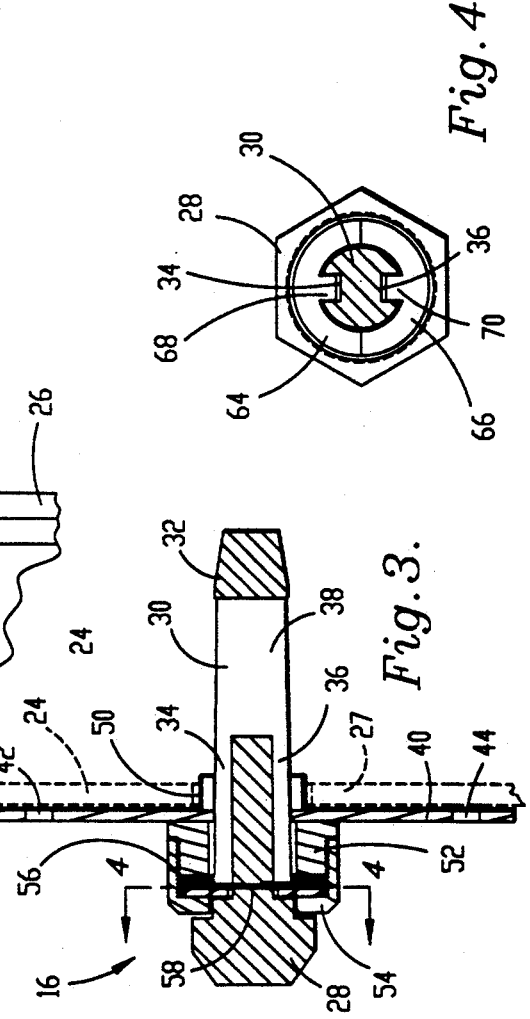

CONNECTOR PIN ASSEMBLY FOR CONCRETE FORM PANEL UNITS

BACKGROUND OF THE INVENTION

1. Field of the Invention

The present invention is broadly concerned with an improved, retrofittable connector pin assembly of the type designed for releasably interconnecting a pair of adjacent, apertured concrete form panels. More particularly, it is concerned with such a pin assembly which is designed to be permanently attached to a form panel with a shiftable pin adapted to extend into and through aligned panel apertures for interconnection purposes. A resilient metallic retaining ring is applied about the pin in order to retain the pin in substantial alignment with the panel connection aperture, thereby minimizing pin wobble or misalignment.

2. Description of the Prior Art

Many present day poured concrete structures are constructed using prefabricated, reusable, interlocking form sections or panels. These panels are necessarily of relatively high strength, yet preferably are compact and lightweight. Thus, concrete form panels are advantageously constructed from aluminum, and are designed to be interconnected end-to-end as well as in opposed relationship, to present a wall form for example. For purposes of end-to-end interconnection, the panels generally include vertically extending end walls having a series of spaced openings therethrough. When placed in juxtaposition with the end wall apertures in alignment, the individual panels are typically interconnected by means of slotted pin and wedge assemblies. Thus, slotted pins are driven through aligned end wall apertures, and a wedge is then placed within the pin slot in order to lock the individual panels together. When the form is disassembled, the wedges are loosened and removed, and the pins extracted from the form panel apertures.

Use of traditional detached panel connection hardware presents a number of problems. First and foremost, many of the hardened pins and wedges are lost during the normal process of form construction and disassembly, simply because they are not permanently attached to a form panel. Moreover, use of this detached hardware can be labor-intensive, inasmuch as the panels must be held in alignment, while the connection hardware is first properly positioned and then driven into place.

In response to these problems, attempts have been made at developing pin assemblies which are permanently secured to the form panels. For example, U.S. Pat. No. 4,194,717 describes such an assembly wherein a pin or bolt is shiftably mounted adjacent the end wall of a form panel, and is adapted for passage through aligned end wall apertures for connection purposes. In addition, the pin includes a groove adjacent the rearward end thereof which is adapted to receive a locking wedge when the pin is in its retracted position, thereby maintain the pin in this position and allowing wedge storage.

Another attached hardware system makes use of a tapered pin having a rearward extension received within a slide block, the latter carrying a synthetic resin disk designed to maintain the position of the locking pin relative to the panel end wall aperture. Here again, the pins are driven forwardly and passes through aligned panel apertures, and a tapered wedge is used to complete the panel interconnection.

One drawback of these prior designs stems from the fact that they are not readily retrofittable, requiring welded-on attachments to the individual form panels. Furthermore, they relatively heavy, which is significant when it is considered that a large number of forms are typically transported to a construction site. Finally, these designs suffer from the fact that, owing to normal pin wear, the pins can become significantly misaligned or subject to "wobble." This is objectionable not only because the installer must manually align the pins before panel connection can be completed, but also because such misaligned pins may prevent or interfere with stacking and handling of detached panels.

Accordingly, there is a real and unsatisfied need in the art for a simplified, lightweight, readily retrofittable, permanently attached connection pin assembly for use with concrete form panels which overcomes the problem of pin misalignment.

SUMMARY OF THE INVENTION

The present invention overcomes the problems outlined above and provides an assembly for releasably interconnecting pairs of structural forms. Broadly speaking, the assembly of the invention includes an elongated, axially tapered pin bored for receipt of a locking wedge and presenting a rearward end and a forward end, along with means for coupling the pin to one of the panel end walls adjacent a panel connection aperture. The coupling means permits selective axial movement of the pin between an extended, connecting position wherein the pin extends through the aligned apertures of a pair of end walls, and a retracted position. This coupling means includes a resilient metallic retaining ring disposed about the tapered pin and operable for frictionally and compressively engaging the pin at all axially shifted positions thereof. This serves to retain the pin at both of the extreme connecting and retracted positions thereof, as well as all intermediate positions, and in substantial alignment with the adjacent wall aperture.

In preferred forms, the pin is provided with at least one, and preferably a pair of slots along the length thereof, together with split tab washer means preventing detachment of the pin from the panel wall. To this end, the pin coupling means advantageously includes a plate securable by rivets or other means to the panel end wall, with the plate having a threaded boss; an annular, threaded, pin-receiving cap nut is applied over the threaded boss, with the split tab washer and resilient retaining ring being captively held between the outer end of the boss and the cap nut. The tapered pin extends through the cap nut, boss and plate, and is retained by the action of the split tab washer.

The resilient metallic retaining ring is preferably designed to exert sufficient pressure on the pin to require a substantial force to shift the pin from either its retracted or connecting positions. In this way, the pin is maintained in substantial alignment with the adjacent panel end wall aperture, even after extended uses of the pin assembly.

BRIEF DESCRIPTION OF THE DRAWINGS

FIG. 1 is a fragmentary perspective view illustrating the pin assembly of the invention permanently attached to a form panel end wall and in use interconnecting a pair of adjacent form panels;

FIG. 2 is a view similar to that of FIG. 1, but illustrating the connection pin in its retracted position;

FIG. 3 is a sectional view taken along line 3—3 of FIG. 1 and illustrating the construction of the pin assembly;

FIG. 4 is a vertical sectional view taken along line 4—4 of FIG. 3 and depicting the split tab washer retainer employed for preventing detachment of the locking pin;

FIG. 5 is an elevational view of the resilient metallic retaining ring forming a part of the pin assembly;

DETAILED DESCRIPTION OF THE PREFERRED EMBODIMENTS

Figure 7:
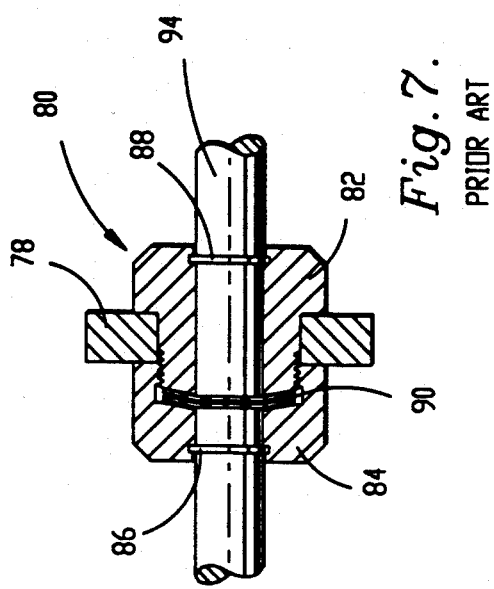
FIG. 7 is an enlarged, fragmentary sectional view illustrating the metallic slide block forming a part of the prior art pin assembly.

Turning now to the drawings, and particularly FIGS. 1-5, a pin assembly 10 for releasably interconnecting a pair of structural form panels 12, 14 is illustrated. Broadly speaking, the assembly 10 includes an elongated, axially tapered connection pin 16, as well as coupling means 18 for permanently securing the pin to a respective panel (e.g., panel 12) for selective axial movement of the pin between panel-connecting and retracted positions.

In more detail, each of the form panels 12, 14 includes a generally rectangular form-defining sidewall 20, 22 with a pair of endmost, rearwardly extending, upright end walls 24, 26 (only one such end wall is shown for each panel in FIGS. 1 and 2). The respective end walls 24, 26 are provided with a series of vertically spaced apertures therethrough (such as aperture 27 of FIG. 3) which are adapted to receive corresponding pins 16. In use, the end walls 24, 26 of panels 12, 14 are oriented in registry, along with the connection apertures therethrough, as shown in the drawings. Although not illustrated, each of the panels 12, 14 would also include rearwardly extending, horizontal bracing elements secured to the sidewalls 20, 22 as well as end walls 24, 26.

Pin 16 is formed of hardened steel and presents an enlarged head 28 adjacent the rearward end of the pin, as well as an elongated, tapered (1/32") shank 30 and tapered tip 32. As best seen in FIGS. 3 and 4, the shank 30 is provided with a pair of elongated, opposed slots 34, 36 extending substantially the full length thereof from head 28 to tip 32. In addition, a wedge-receiving bore 38 extends between and communicates with the respective slots 34, 36 in the forward portion of shank 30.

Coupling means 18 includes a plate 40 adapted for connection to panel end wall 24. For this purpose, the plate 40 has a pair of apertures 42, 44 therethrough each adapted to receive a connecting rivet 46, 48 extending into end wall 24. The plate 40 further includes a forwardly extending, integral boss 50 adapted to be received within an end plate aperture such as aperture 27 (see FIG. 3). In addition, the plate 40 includes a rearwardly extending, fillet welded, externally threaded connection boss 52 in registry with boss 50 and secured to the face of plate 40 remote from the latter.

The overall coupling means 18 further includes a threaded, annular end cap 54 which is threaded onto boss 52 as illustrated, leaving a substantial annular open area 56 between the rearmost face of boss 52 and the adjacent inner face of end cap 54. A pair of operating components are disposed within area 56, namely a resilient metallic retaining ring 58 and a split tab washer 60. The ring 58 (FIG. 5) is formed from heat treated, high carbon steel and presents one complete convolution with a substantial overlap section 62. The ring 58 is designed to compressively and frictionally engage shank 30 with considerable force. The washer 60 is likewise formed of high carbon heat treated steel and presents a pair of mirror image sections 64, 66 of semicircular configuration having corresponding tabs 68, 70, the latter being received and slidable in the slots 34, 36. The ring 58 and washer 60 can thus float within area 56, during extension and retraction of pin 16.

In the use of assemblies 10 for interconnecting the panels 12, 14, the individual pins 16, originally in the retracted position of FIG. 2, are driven forwardly until the pins assume the FIG. 3 position. This is typically accomplished by means of a hammer blow on head 28 serving to drive each pin to the FIG. 3 connecting position. By virtue of the associated retaining ring 58, approximately a nine pound force is required to drive each pin. At this point, the connection apertures of the mating panel 14 are aligned with the extended pins 16 and the panel end walls 24, 26 are moved together to the FIG. 1 position. Connection between the panels 12, 14 is completed by placement of locking wedges 72 into the respective pin bores 38, with a downwardly directed hammer blow serving to tightly engage the wedges within the bores and against the rear face of end wall 26.

When it is desired to disassemble the panels 12, 14, the individual wedges 72 are first removed, whereupon a hammer blow is delivered to the tip end 32 of each pin 16, thereby driving the pins rearwardly to their retracted FIG. 2 positions wherein the pins 16 clear the associated connection apertures of panel end wall 26. An approximate seven pound force is required to drive the pins to their retracted positions.

An indicated, in preferred forms, the retaining ring 58 exerts sufficient pressure or force on pin 16 so as to require slightly less driving force on the pin to shift the pin rearwardly, as compared with forward driving. While this differential driving force is preferably about nine pounds versus seven pounds, the requisite driving force may be substantially the same and somewhat less, e.g., at least about six pounds driving force in both directions. The ring 58 serves to retain pin 16 in its connecting and retracted positions in substantial alignment with the associated panel end wall aperture. Moreover, the ring serves to clean excess concrete from the pin in order to prevent fouling thereof.

The split washer 60 serves to prevent complete detachment of pin 16 from plate 40 during use thereof. Specifically, the respective tabs 68, 70, fitting within the slots 34, 36, serve as limit stops for the pin and prevent complete detachment of the pin. Furthermore, the construction of washer 60 permits the pin 16 to rotate a full 360° while being retained.

A particular advantage of the assembly of the present invention stems from the fact that it can be readily retrofitted onto existing forms. Typically, such forms include a hardened metallic plate adjacent the connection apertures thereof, which is riveted in place. When retrofitting is desired, it is only necessary to remove these existing plates and apply the plate 40 using rivets 46, 48, followed by attachment of the remaining assembly hardware. Another approach to retrofitting such existing panels involves simply welding onto the hardened metallic plates thereof an externally threaded connection boss 52 in registry with the original plate aperture, followed by attachment of the remaining assembly components. This method of retrofitting is advantageous in that it requires very little time and modification of the existing form. The compact, lightweight nature of assembly 10, whether originally supplied with a formal panel or retrofitted, adds only minimal weight to a form panel. Finally, provision of the metallic retaining ring 58 with each assembly 10 permits multiple uses of the assemblies without fear that the pin 16 will become misaligned or subject to wobble.

Figure 8:
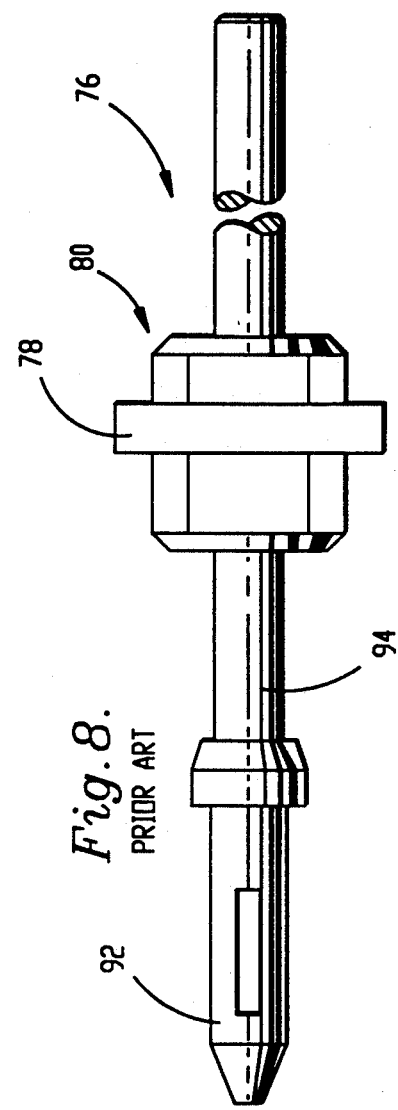
FIG. 8 is a fragmentary plan view of the prior art pin assembly illustrated in FIGS. 6 and 7.
Figure 6:
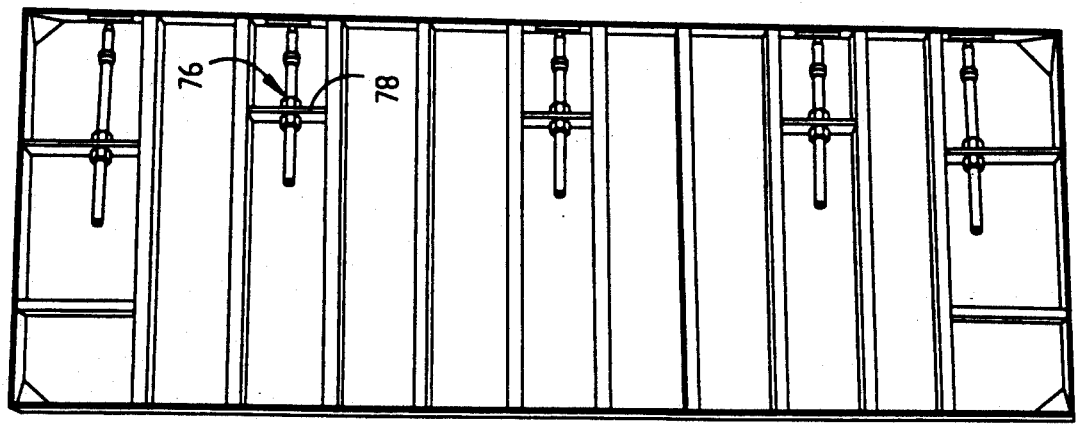
FIG. 6 is an elevational view of a prior art concrete form panel, equipped with a prior attached connection pin assembly.

The advantages of the present invention are to be contrasted with a prior art attachment system illustrated in FIGS. 6–8. As shown in FIG. 6, a form panel 74 is equipped with a plurality of the prior art assemblies 76. Each assembly 76 is equipped with a vertically extending mounting flange 78 which must be welded onto an existing panel. The flange 78 supports a two-piece, aluminum slide block 80. The block 80 includes a pair of threadably interconnected sections 82, 84, each of the latter having a press fit, metallic wear ring 86, 88 therein. Moreover, a synthetic resin nylon disk 90 is situated between the sections 82, 84. A bored, tapered connection pin 92 is also provided, which has a rearward, elongated, untapered extension 94 secured thereto. The extension 94 extends through block 80 and is engaged by the disk 90.

Although this prior system represented an improvement in the art, problems were presented by virtue of the weight of the assembly and the attendant cost encountered in attaching the assembly to a panel, particularly where retrofitting was desired. Furthermore, the nylon control disks 90 were subject to wear, to the point that the pins and extensions could wobble or become misaligned relative to the associated end wall apertures.

We claim:

1. An assembly for releasably interconnecting a pair of structural form panels cooperatively presenting a pair of adjacent walls having respective aligned apertures therethrough, said assembly comprising:
    an elongated, axially tapered pin presenting a longitudinal axis, a rearward end and a forward end;
    means for coupling said pin to one of said walls with said forward end adjacent the aperture through said one wall, for selective axial movement of the pin between an extended, connecting position wherein the pin extends through the apertures of both of said walls, and a retracted position wherein the pin clears the aperture through the other of said walls,
    said coupling means including a resilient metallic retaining ring disposed about said tapered pin and operable for frictionally and compressively engaging the pin at all axially shifted positions thereof in order to retain said pin at said connecting and retracted positions respectively in substantial alignment with said one wall aperture,
    said pin having structure defining a bore therethrough proximal to said forward end, said bore extending completely through said pin in a transverse orientation relative to the longitudinal axis of said pin; and
    a wedge configured for receipt within said bore when said pin is in the extended connecting position thereof for preventing unintended shifting of the pin to said retracted position thereof.

2. The assembly of claim 1, including means for preventing detachment of said pin from said one wall.

3. The assembly of claim 2, said detachment-preventing means including structure defining an elongated slot along the length of said pin, and tab means engaging said slot.

4. The assembly of claim 3, said pin having an enlarged head at said rearward end thereof, said coupling means including an annular end cap operably connected with said one wall and captively holding said ring and said tab means between the end cap and one wall.

5. The assembly of claim 4, said one wall having a threaded boss secured thereto and disposed about said one wall aperture, said end cap being threadably secured to said boss.

6. The assembly of claim 1, including means for preventing detachment of said pin from said one wall, and a pair of opposed slots along the length of said pin, said preventing means comprising a split tab washer disposed about said pin and having a pair of tabs respectively oriented for sliding receipt within a corresponding pin slot.

7. The assembly of claim 1, said retaining ring exerting sufficient pressure on said pin to require a force of at least about six pounds to shift the pin from either said positions.

8. The assembly of claim 1, said coupling means including a plate securable to said one wall, there being means connected with said plate for holding said retaining ring.

9. An assembly for releasably interconnecting a pair of structural form panels cooperatively presenting a pair of adjacent walls having respective aligned apertures therethrough, said assembly comprising:
    an elongated, axially tapered pin presenting a rearward end and a forward end;
    means for coupling said pin to one of said walls with said forward end adjacent the aperture through said one wall, for selective axial movement of the pin between an extended, connecting position wherein the pin extends through the apertures of both of said walls, and a retracted position wherein the pin clears the aperture through the other of said walls,
    said coupling means including a resilient metallic retaining ring disposed about said tapered pin and operable for frictionally and compressively engaging the pin at all axially shifted positions thereof in order to retain said pin at said connecting and retracted positions respectively in substantial alignment with said one wall aperture; and
    means for preventing detachment of said pin from said one wall, said detachment-preventing means including structure defining an elongated slot along the length of said pin, and tab means engaging said slot,
    said pin having an enlarged head at said rearward end thereof, said coupling means including an annular end cap operably connected with said one wall and captively holding said ring and said tab means between the end cap and one wall, and
    said one wall having a boss secured thereto and disposed about said one wall aperture, said end cap being releasably secured to said boss.

* * * * *